US005770819A

United States Patent [19]
Mehan

[11] Patent Number: 5,770,819
[45] Date of Patent: Jun. 23, 1998

[54] INSULATED WIRE OR CABLE HAVING FOAMED FLUOROPOLYMER INSULATION

[75] Inventor: Ashok Mehan, Union City, Calif.

[73] Assignee: Raychem Corporation, Menlo Park, Calif.

[21] Appl. No.: 547,001

[22] Filed: Oct. 23, 1995

Related U.S. Application Data

[63] Continuation-in-part of Ser. No. 388,340, Feb. 13, 1995, Pat. No. 5,468,782.

[51] Int. Cl.$^6$ ..................................................... H01B 7/30
[52] U.S. Cl. .............................. 174/110 PM; 174/110 F; 174/110 FC; 521/134; 525/200
[58] Field of Search ........................ 174/110 N, 110 PM, 174/110 FC, 110 F; 521/134, 145; 525/199, 200

[56] References Cited

U.S. PATENT DOCUMENTS

| | | | |
|---|---|---|---|
| 3,847,881 | 11/1974 | Mueller et al. | 526/153 |
| 4,033,939 | 7/1977 | Schulze | 525/200 |
| 4,331,619 | 5/1982 | Chung et al | 521/92 |
| 4,454,249 | 6/1984 | Suzuki et al. | 521/54 |
| 4,624,990 | 11/1986 | Lunk et al. | 525/199 |
| 4,716,073 | 12/1987 | Randa | 428/215 |
| 4,886,689 | 12/1989 | Katliar et al. | 428/35.7 |
| 4,904,735 | 2/1990 | Chapman et al. | 525/165 |
| 4,914,158 | 4/1990 | Yoshimura et al. | 525/199 |
| 5,032,621 | 7/1991 | Buckmaster | 521/85 |
| 5,173,960 | 12/1992 | Dickinson | 385/100 |
| 5,202,946 | 4/1993 | Hardin | 385/109 |

FOREIGN PATENT DOCUMENTS 0 330 926 A2   9/1989   European Pat. Off. ...... C08L 101/00

OTHER PUBLICATIONS

Chemical Abstracts 86 No. 24, Abstract No. 173193 (JP pat. No. 52013530 Feb. 1, 1977).

*Primary Examiner*—Kristine L. Kincaid
*Assistant Examiner*—Marc D. Machtinger
*Attorney, Agent, or Firm*—Timothy H. P. Richardson; Herbert G. Burkard

[57] ABSTRACT

Insulated wires and cables, especially local area network (LAN) cables, in which the conductors are covered by foamed insulation made from a composition containing an ECTFE polymer having a crystallinity of at least 50% by weight, and, dispersed in the ECTFE polymer, particles of a PTFE polymer having a crystallinity of at least 50%, the ratio by weight of the ECTFE polymer to the PTFE polymer being 1:1 to 9:1.

9 Claims, No Drawings

INSULATED WIRE OR CABLE HAVING FOAMED FLUOROPOLYMER INSULATION

CROSS REFERENCE TO RELATED APPLICATION

This application is a continuation-in-part of my commonly assigned application Ser. No. 08/388,340 filed Feb. 13, 1995, U.S. Pat. No. 5,468,782 the entire disclosure of which is incorporated herein by reference.

BACKGROUND OF THE INVENTION

1. Field of the Invention

This invention relates to fluoropolymer compositions.

2. Introduction to the Invention

Fluoropolymers are well known and are useful in a broad range of applications. For example, many fluoropolymers can be melt extruded around conductors to provide electrical insulation thereon. Ethylene/tetrafluoroethylene copolymers (usually referred to as ETFE or ETFE polymers), and copolymers of tetrafluoroethylene with hexafluoropropylene or with a perfluorinated vinyl ether, are particularly useful for this purpose; ethylene/chlorotrifluoroethylene copolymers (usually referred to as ECTFE or ECTFE polymers) have also been used. For low loss insulation, the fully fluorinated copolymers are preferred, since the electrical insulation properties of ECTFE are poor by comparison. Tetrafluoroethylene polymers (usually referred to as PTFE) have excellent electrical insulation properties, but generally have very high molecular weights and crystallinities, such that the polymers cannot be melt extruded. However, it has been proposed to blend PTFE (especially PTFE which has been irradiated to reduce its molecular weight) with other fluoropolymers having a relatively low crystallinity, thus preparing a composition which can be melt extruded but which has improved properties resulting from the presence of the PTFE. U.S. Pat. No. 4,624,990, the disclosure of which is incorporated herein by reference for all purposes, discloses melt-shapeable compositions which comprise (a) a first melt-shapeable fluoropolymer having a crystallinity less than 45%, preferably less than 30%, and (2) a second fluoropolymer which has a crystallinity of at least 50% and which cannot be melt extruded on its own, preferably irradiated PTFE. The first fluoropolymer is preferably a copolymer of tetrafluoroethylene and one or more perfluorinated comonomers, e.g. hexafluoropropylene or perfluorovinyl ether, but ECTFE polymers are also referred to. The ratio of first fluoropolymer to second fluoropolymer is preferably 0.3:1 to 2.5:1, particularly 0.3:1 to 1:1. The patent refers to the possibility of foaming the composition as it is shaped, e.g. to provide low loss insulation.

SUMMARY OF THE INVENTION

I have discovered, in accordance with the present invention, that, contrary to the teaching of U.S. Pat. No. 4,624,990, very valuable melt-shapeable compositions can be obtained by blending fine particles of PTFE (and similar highly fluorinated high molecular weight polymers) with fluoropolymers whose crystallinity is substantially higher than the 45% maximum in U.S. Pat. No. 4,624,990, preferably at least 50%, particularly 50 to 75%, in particular ECTFE polymers.

The invention is particularly valuable in that it provides, for the first time, a way in which ECTFE polymers can be used to provide wire insulation having electrical properties which are satisfactory in many critical end uses. In particular, this invention makes it possible, for the first time, to use ECTFE polymers as foamed electrical insulation which has low losses at high frequency, in particular to meet the demands which are placed upon plenum cables for local area networks (LANs).

Particularly useful results are obtained when the fluoropolymer/PTFE composition is foamed while it is being shaped. I believe that in such a process, the PTFE particles not only act as nucleation sites for the cells of the foam, but also change the flow characteristics of the fluoropolymer, and that this is responsible (at least in part) for the surprising and valuable properties of foamed compositions of the invention. In particular, the type and quantity of the PTFE particles can be chosen so as to result in a foamed structure which is very uniform and in which the voids are small in size. This uniform small foam structure apparently limits the adverse effects, especially on elongation, which would normally be expected from the presence of a filler, making it possible to use matrix polymers whose crystallinity would otherwise be too high to retain the PTFE particles in a structure having adequate elongation. The incorporation of the PTFE particles also has a very beneficial effect on the electrical properties of the foam (especially its attenuation at high frequencies).

This invention is particularly valuable when the end product is an insulated wire or cable in which the insulation comprises a melt extruded jacket of foamed ECTFE polymer having PTFE particles dispersed therein. The invention is, therefore, chiefly described herein by reference to such an end product and its preparation. However, it is to be understood that the invention also includes (a) end products which are not foamed, and/or which have been melt-shaped in some other way, and/or which are not in the form of an insulating jacket, (2) melt-shapeable compositions which can be converted into the preferred foamed ECTFE polymer insulating jackets and/or the other end products, and (3) corresponding end products and melt-shapeable compositions in which all or part of the ECTFE polymer has been replaced by another fluoropolymer having a crystallinity of at least 50%, and/or in which all or some of the PTFE particles have been replaced by particles of another polymer (which may or may not be a fluoropolymer) which retain their particulate identity during melt-shaping. Similarly, insofar as the description below specifically discloses a particular feature only in combination with one or more other features, it is to be understood that that particular feature can also be used in other combinations in accordance with the invention.

A first preferred aspect of the invention provides a composition which can be melt-shaped or has been melt-shaped and which comprises (1) a copolymer of ethylene and chlorotrifluoroethylene (ECTFE) which has a crystallinity of at least 50%, and (2) a polymer of tetrafluoroethylene (PTFE) which has a crystallinity of at least 50% and which is in the form of fine particles dispersed in the ECTFE;

the ratio by weight of the ECTFE to the PTFE being 1:1 to 9:1, preferably 1:1 to 4:1.

A second preferred aspect of the invention provides a method of making a melt-shaped, foamed polymeric article which comprises simultaneously melt shaping and foaming a melt-shapeable composition according to the first aspect of the invention.

A third preferred aspect of the invention provides an insulated wire which comprises (A) a conductor, and (B) an insulating jacket which surrounds the conductor and which is composed of a melt extruded composition according to the first aspect of the invention, the composition preferably being foamed.

A fourth preferred aspect of the invention provides a local area network cable which comprises at least three substantially identical twisted pairs of insulated wires, each of the insulated wires consisting essentially of (A) a conductor, and (B) an insulating jacket which (a) surrounds the conductor, and (b) is composed of a foamed polymeric composition having a continuous phase which consists essentially of a copolymer of ethylene and chlorotrifluoroethylene (ECTFE) having a crystallinity of at least 50%;

the cable having an attenuation of less than 23 dB/100 m at 100 Mhz when constructed and tested in accordance with Telecommunications Industry Association standard TIA/EIA-568-A per proposal SP-2840-A, under Category 5, 100 Ohm, UTP Cables.

DETAILED DESCRIPTION OF THE INVENTION

Throughout this specification, ratios, percentages and parts are by weight unless otherwise specified, and crystallinities are measured by X-ray diffraction.

ECTFE Polymers

The ECTFE polymers used as starting materials in this invention can be melt shaped and preferably consist essentially of (a) 40 to 60%, particularly 45 to 55%, e.g. about 50%, of units derived from ethylene (b) 40 to 60%, particularly 45 to 55%, e.g. about 50%, of units derived from chlorotrifluoroethylene, and (c) optionally, up to 5%, particularly not more than 2%, of units derived from one or more other monomers, e.g. tetrafluoroethylene, hexafluoropropylene, hexafluoroisobutylene, a perfluorinated vinyl ether, vinylidene fluoride, or an olefin.

The crystallinity of the ECTFE polymer is at least 50%, preferably at least 55%, for example 55 to 65%. Mixtures of two or more ECTFE polymers can be used.

Suitable ECTFE polymers are commercially available, for example those sold by Ausimont USA Inc. under the trade name Halar.

PTFE Polymers

The PTFE polymers used in this invention preferably consist essentially of (a) 95 to 100%, particularly substantially 100%, of units derived from tetrafluoroethylene, and (b) 0 to 5%, particularly not more than 2%, of units derived from one or more copolymerizable monomers, e.g. hexafluoropropylene, perfluorinated vinyl ether, hexafluoroisobutylene, vinylidene fluoride, or an olefin.

The crystallinity of the PTFE is at least 50%, preferably at least 60%, and will often be much higher, e.g. 70 to 90%. The PTFE polymer is preferably a polymer which cannot be melt shaped in the absence of other polymers, particularly a polymer which has been degraded by irradiation of such a polymer, e.g. to a dose of 5 to 30 Mrad.

The PTFE polymer is present in the form of fine particles which are dispersed in the ECTFE polymer. The average size of the particles is preferably 0.05 to 5 micron, particularly 0.1 to 0.3 micron, and it is preferred that at least 70%, particularly at least 85%, of the particles have a diameter of 0.1 to 0.4 micron. These sizes refer to the size of the particles themselves. The particles may be present, at least in the material which is added to the ECTFE polymer, in the form of aggregates of much greater size, e.g. 100–200 micron, which break down during dispersion and processing. The invention includes compositions in which some or all of the PTFE is present as fibrils formed by fibrillation of the PTFE particles initially present. Two or more PTFE polymers can be used together.

Suitable PTFE polymers are commercially available, for example those sold by DuPont under the trade names Teflon MP1000 and Teflon MP1500.

Relative Proportions of ECTFE and PTFE Polymers

The PTFE polymer should be added to the ECTFE polymer in an amount which provides the desired modification of its physical and/or electrical properties. The ratio of ECTFE to PTFE is preferably 1:1 to 9:1, particularly 1.25:1 to 8.5:1, especially 1.5:1 to 4:1.

Other Ingredients

The composition can contain one or more other polymeric ingredients in addition to the ECTFE and PTFE polymers providing that they do not result in undesirable properties. However, it is preferred that such other polymers, if present at all, are present in amount less than 20%, particularly less than 5% of the weight of the composition. Such additional polymeric ingredients can for example be in the form of fine particles (e.g. of the preferred size ranges given for the PTFE particles) which remain distinct during processing, e.g. particles of high density polyethylene.

The composition can also contain one or more other non-polymeric ingredients, e.g. antioxidants, processing aids, acid scavengers, flame retardants, fillers (reinforcing or non-reinforcing, conductive or non-conductive), foaming agents and nucleating agents. The amount of any such non-polymeric ingredients is preferably less than 15%, particularly less than 5% of the weight of the composition, with lesser amounts, preferably less than 5%, especially less than 1%, being preferred when the composition is to be foamed. For compositions which are to be used for electrical insulation, as is preferred, the presence of conductive fillers and other ingredients having an adverse effect on insulative properties should of course be avoided.

Melt Shaping the Compositions

The compositions of the invention can be melt-shaped in any convenient way, including molding and melt-extrusion, which is generally preferred. Generally, the presence of the fine particles of PTFE will result in some degree of foaming, even when no positive steps are taken to cause foaming. Preferably, positive steps are taken to foam the composition as it is melt-extruded. The composition can contain a foaming agent which decomposes into a gas as the composition is extruded. Alternatively, a gaseous foaming agent, e.g. nitrogen or a perfluorinated hydrocarbon such as perfluoropentane, can be injected into the composition as it is being extruded, as disclosed for example in U.S. Pat. No. 4,560,829 (Reed and Lunk), the disclosure of which is incorporated herein by reference.

End Products

The invention is particularly useful for providing insulation, especially foamed insulation, on a conductor, or around a number of independently insulated conductors, and for providing other foamed products. The composition can for example be in the form of a jacket which provides the sole insulation around a single conductor, or one layer of a multi-layer jacket around a single conductor, or a single jacket or one layer of multi-layer jacket, around two or more individually insulated conductors. The thickness of the insulation is for example 0.004 to 0.100 inch, preferably 0.006 to 0.010 inch for a single layer jacket, or, for example, 0.005 to 0.25 inch, preferably 0.008 to 0.050 inch, for a layer in a multi-layer jacket.

The foamed products of the invention preferably contain at least 10%, particularly at least 15%, especially 20 to 40%, by volume of a gas. Such products typically have an apparent density of 0.8 to 1.5 g/cc, preferably 1.0 to 1.3 g/cc. A high gas content is valuable in decreasing attenuation, but has an adverse effect on elongation. The elongation of the foamed products is preferably at least 25%, particularly at least 33%, e.g. 33 to 50%.

EXAMPLES

The invention is illustrated by the following Examples.

The Examples are summarized in the Table below. In each Example, the ingredients and amounts thereof listed in the Table were mixed together and melt-extruded as a foamed insulating jacket around a solid copper wire to give a jacket having an inner diameter (ID), an outer diameter (OD) and a percent by volume of air (% air) as shown in the Table. The ingredients were mixed on a 30 mm counter rotating Twin Screw Brabender fitted with Sigma type of blades; mixer barrel temperatures were maintained at 235° to 250° C. and the screw rotation speed was between 40 to 50 revolutions per minute. The compounded pellets were subsequently melt extruded over the copper conductor on a 1.25 inch 32:1 L/D extruder, using a pressure type of setup. The extruder was fitted with a two stage mixing screw and with provision for a gas injection at about 25 inches away from the hopper end. Perfluoropentane was used as a blowing agent and was injected into the barrel at about 3000 psi at a concentration level of about 0.07% by weight of the polymer mixture. The extruder barrel was maintained at 240° to 280° C. The hot resin gas mixture was forced through a standard crosshead die arrangement and quickly cooled in a cold water trough, to get a round, well blown insulating layer around the conductor. The elongation of the foamed insulation was measured by the method of ASTM D 3032 at a jaw separation speed of 2 inch/minute. The coated wires were made into twisted pairs, and 4 twisted pairs were assembled as a 100 Ohm, Category 5 cable, in accordance with guidelines given in TIA/EIA standard 568-A. The lay lengths of individual component cables were 0.55, 0.65, 0.7 and 0.9 inches respectively, while the lay length of the 4 pair cable was 5 inches. A 0.008 inch thick outer jacket, was extruded over this 4 pair bundle. ECTFE from Ausimont USA, sold as Halar 930, was used for this layer for providing mechanical protection to the signal carrying cables. The average characteristic impedance in ohms and average attenuation in dB/100 meters of the plenum cables were measured at various frequencies, and the results are shown in the Table. The characteristic Impedance values were derived from the swept frequency input impedance measurements using a network analyzer with an s-parameter test set in accordance with ASTM D 4566, method 3. Attenuation was derived from swept frequency signal level measurements at the output of the cable in accordance with ASTM D 4566. Complete details of the test method are given in Telecommunications Industry Association standard TIA/EIA-568-A per proposal SP-2840-A, under Category 5, 100 Ohm, UTP Cables. The disclosure of each of these tests and documents is incorporated herein by reference.

The following abbreviations are used in the Table.

| | |
|---|---|
| ECTFE | is an ethylene(chlorotrifluoroethylene) copolymer sold Ausimont USA Inc. under the trade name Halar 500, which is believed to be a 50:50 copolymer of ethylene and chlorotrifluoroethylene. |
| MP1000 | is polytetrafluoroethylene available from DuPont under the trade name Teflon MP1000, which is believed to be an irradiated homopolymer of tetrafluoroethylene in the form of loose 150 micron agglomerates of 0.2 micron particles. |
| BMP1000 | is a product obtained by irradiating MP1000 to a dosage of about 20 Mrad. |
| Algo | is polytetrafluoroethylene available from Ausimont USA Inc. under the trade name Algoflon F7, which is believed to be a homopolymer of tetrafluoroethylene. |
| B Algo | is a product obtained by irradiating Algoflon F7 to a dosage of about 20 Mrad. |
| BN | is boron nitride available from Cerac Inc., under the trade name B1084, which is in the form of a powder which is believed to be at least 99% partiales of 1 micron or less. |

TABLE

| Example No. | 1A* | 1B* | 2 | 3 | 4 | 6 |
|---|---|---|---|---|---|---|
| ECTFE | 99 | 99 | 75 | 65 | 65 | 65 |
| B Algo | — | — | 25 | 35 | — | — |
| MP1000 | — | — | — | — | 35 | — |
| B MP1000 | — | — | — | — | — | 35 |
| BN | 1 | 1 | — | — | — | — |
| ID (inch) | 0.0223 | 0.0202 | 0.0202 | 0.0223 | 0.0225 | 0.0223 |
| OD (inch) | 0.038 | 0.037–0.038 | 0.035 | 0.035 | 0.038 | 0.038 |
| % air | 37.5 | 35 | 32 | 29 | 44 | 41 |
| Elongation % | 150 | 250 | 70 | 42 | 17 | 43 |

TABLE-continued

| Example No. | 1A* | 1B* | 2 | 3 | 4 | 6 |
|---|---|---|---|---|---|---|
| Impedance at | | | | | | |
| 1 MHz | 115.1 | 111.0 | 112.9 | 115.2 | 108.6 | 111.3 |
| 10 MHz | 113.5 | 108.7 | 108.6 | 111.3 | 106.4 | N/A |
| 25 MHz | N/A | 107.9 | 108.0 | 110. | 105.5 | N/A |
| 31.25 MHz | 112 | 107.7 | 107.9 | 110.8 | 105.3 | N/A |
| 62.5 MHz | 111.4 | 107.2 | 107.6 | 111. | 104.8 | N/A |
| 100 MHz | 111.0 | 107.0 | 107.5 | 110.6 | 104.5 | 106.4 |
| Attenuation at | | | | | | |
| 1 MHz | 1.88 | 1.8 | 1.75 | 1.69 | 1.66 | 1.62 |
| 10 MHz | 6.33 | 6.4 | 6.2 | 5.8 | 5.8 | N/A |
| 25 MHz | 10.55 | 10.9 | 10.2 | 9.6 | 9.6 | N/A |
| 31.25 MHz | 11.98 | 12.4 | 11.6 | 10.9 | 10.9 | N/A |
| 62.5 MHz | 17.84 | 18.4 | 17.2 | 16.1 | 16.1 | N/A |
| 100 MHz | 23.46 | 24.1 | 22.63 | 21.12 | 20.94 | 20.76 |

*Examples 1A and 1B are not in accordance with the invention and are included for comparative purposes.

What is claimed is:

1. An insulated wire or cable which comprises (A) a conductor, and
(B) an insulating jacket which surrounds the conductor and which is composed of a melt extruded, foamed composition comprising
    (1) a copolymer of ethylene and chlorotrifluoroethylene (ECTFE) which has a crystallinity of at least 50%, and
    (2) a polymer of tetrafluoroethylene (PTFE) which has a crystallinity of at least 50% and which is in the form of fine particles dispersed in the ECTFE;

the ratio by weight of the ECTFE to the PTFE being 1:1 to 9:1.

2. An insulated wire or cable according to claim 1 wherein the foamed composition has an apparent density of 1.0 to 1.3 g/cc.

3. An insulated wire or cable according to claim 1 wherein the foamed composition contains pores which have an average pore size of 10 to 25 microns, and substantially all of which have a size of 5 to 35 microns.

4. An insulated wire or cable according to claim 1 wherein the jacket has an elongation of 33 to 50%.

5. An insulated wire or cable according to claim 1 wherein the jacket contains 20 to 40% by volume of gas.

6. An insulated wire or cable according to claim 1 wherein the jacket is in the form of a single layer which surrounds and contacts the conductor and is 0.006 to 0.010 inch thick.

7. An insulated wire or cable according to claim 1 wherein the ratio by weight of the ECTFE to the PTFE is 1.5:1 to 4:1.

8. A local area network cable which has an attenuation of less than 23 dB/100 m at 100 MHz and which comprises at least three substantially identical twisted pairs of insulated wires, each of the insulated wires consisting essentially of (A) a conductor, and
(B) an insulating jacket which
    (a) surrounds the conductor, and
    (b) is composed of a foamed polymeric composition having a continuous phase which consists essentially of a copolymer of ethylene and chlorotrifluoroethylene (ECTFE), said ECTFE copolymer having a crystallinity of at least 50% and consisting essentially of
        (i) 45 to 55% by weight of units derived from ethylene,
        (ii) 45 to 55% by weight of units derived from chlorotrifluoroethylene, and
        (iii) 0 to 10% by weight of units derived from one or more other monomers;

and said composition also containing a polymer of tetrafluoroethylene (PTFE) which
    (i) has a crystallinity of at least 50%,
    (ii) is in the form of particles which have an average size of 0.05 to 5 micron and which are dispersed in the ECTFE polymer, and
    (iii) has been obtained by irradiating a PTFE polymer having a crystallinity of at least 60% and consisting essentially of 95 to 100% by weight of units derived from tetrafluoroethylene, and 0 to 5% by weight of units derived from a copolymerizable monomer, the ratio by weight of the ECTFE to the PTFE being from 1.25:1 to 8.5:1, and the ECTFE and the PTFE together constituting at least 90% by weight of the composition.

9. A cable according to claim 8 wherein the ratio by weight of the ECTFE to the PTFE is 1.5:1 to 4:1; the foamed composition contains pores which have an average pore size of 10 to 25 microns and substantially all of which have a size 5 to 35 microns; and the jacket has an elongation of 33 to 50%.

* * * * *